Sept. 28, 1965   V. M. ONORI   3,208,769
TRAILER HOSE COUPLING SUPPORT
Filed Jan. 21, 1963   3 Sheets-Sheet 1

INVENTOR.
VITO M. ONORI
BY Herman L Gordon
ATTORNEY

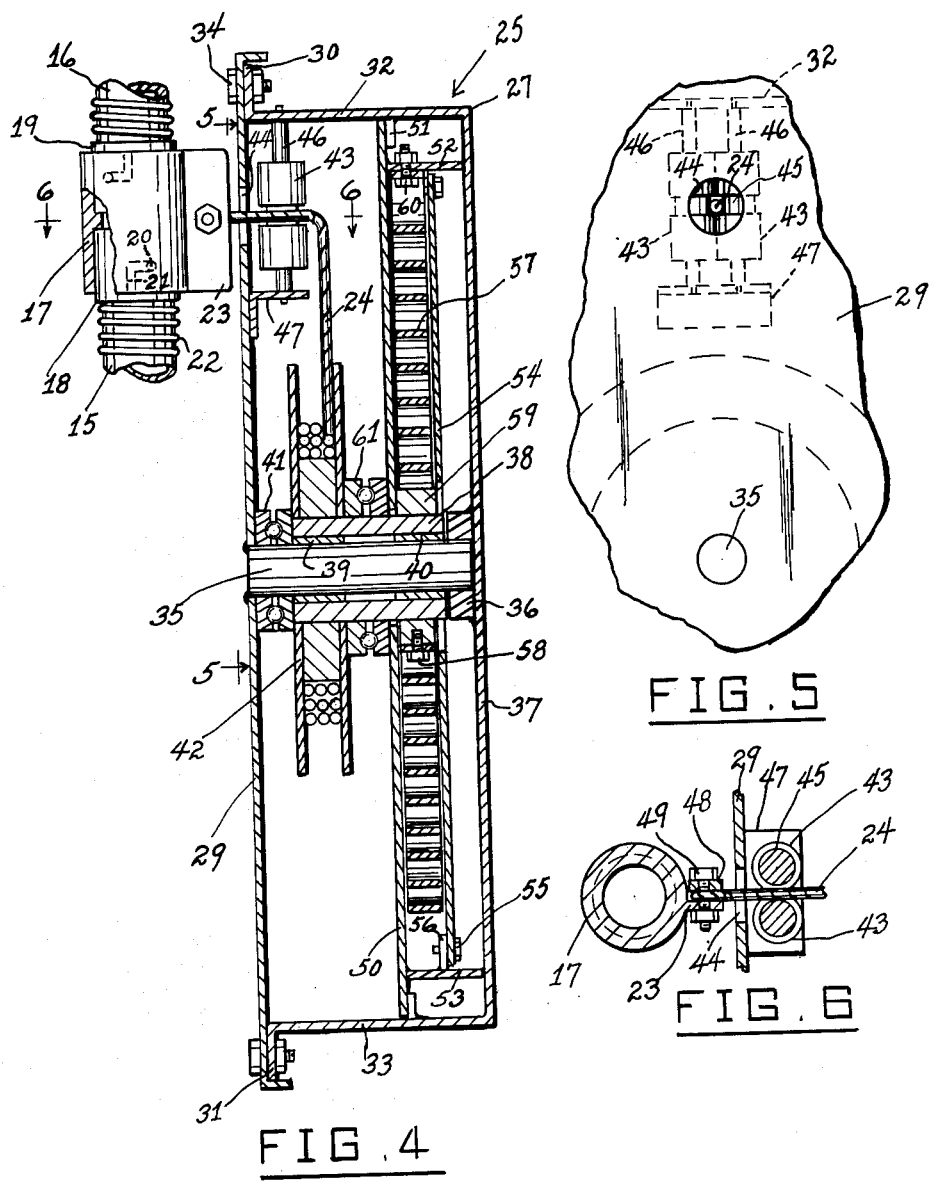

Sept. 28, 1965  V. M. ONORI  3,208,769
TRAILER HOSE COUPLING SUPPORT
Filed Jan. 21, 1963  3 Sheets-Sheet 3

INVENTOR.
VITO M. ONORI
BY Herman L. Gordon
ATTORNEY

United States Patent Office 3,208,769
Patented Sept. 28, 1965

3,208,769
TRAILER HOSE COUPLING SUPPORT
Vito M. Onori, 6017 Hudson Blvd., North Bergen, N.J.
Filed Jan. 21, 1963, Ser. No. 252,701
5 Claims. (Cl. 280—421)

This invention relates to hose supports, and more particularly to means for safely supporting air brake connection hoses between the tractor and the trailer of a trailer truck.

A main object of the invention is to provide a novel and improved means for supporting tractor-trailer air brake connection hoses in a manner to protect said connection hoses against breakage or leakage by contact with or entanglement with the fifth wheel of the associated truck, to prevent the connection hoses from rubbing on the bed of the tractor, and to prevent the connection hoses from coming into contact with grease or oil, whereby wear and deterioration of the connection hoses are minimized, said means being relatively simple in construction, being easy to install, and being very compact in size.

A further object of the invention is to provide an improved yieldable support for the air brake hose or conduit extending between the tractor and trailer of a trailer truck, said support being mechanically rugged, providing ample yieldability to allow the hose or conduit to become extended as required when the truck makes relatively sharp turns or when the tractor is at a large angle from its normal position of alignment with the trailer, and acting to prevent the hose from becoming tangled or twisted.

A still further object of the invention is to provide an improved yieldable support for the hose connector employed to connect the air supply hose of a tractor to the air brake hose of a trailer in a trailer truck, said support involving relatively inexpensive components, being durable in construction, and requiring a minimum amount of care and maintenance.

A still further object of the invention is to provide an improved yieldable and swivelling support for connecting hose members between the tractor and trailer of a trailer truck, said support being smooth in operation, being easily adjustable to provide a desired degree of yieldability, and providing reliable hose supporting action.

Further objects and advantages of the invention will become apparent from the following description and claims, and from the accompanying drawings, wherein:

FIGURE 4 is an enlarged vertical cross-sectional view taken substantially on the line 4—4 of FIGURE 2.

FIGURE 5 is a fragmentary vertical cross-sectional view taken substantially on the line 5—5 of FIGURE 4.

FIGURE 6 is a horizontal cross-sectional view taken substantially on the line 6—6 of FIGURE 4.

Figure 1:
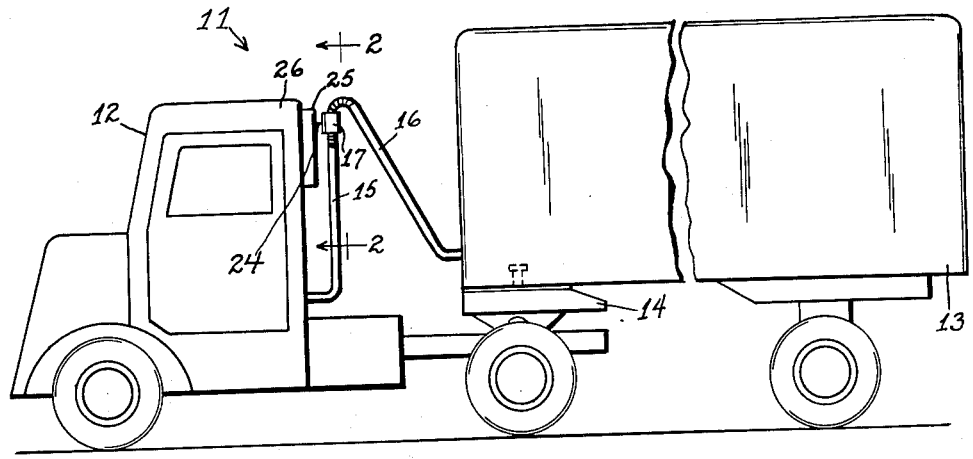
FIGURE 1 is a side elevational view of a trailer truck provided with improved brake hose supporting means constructed in accordance with the present invention.
Figure 2:
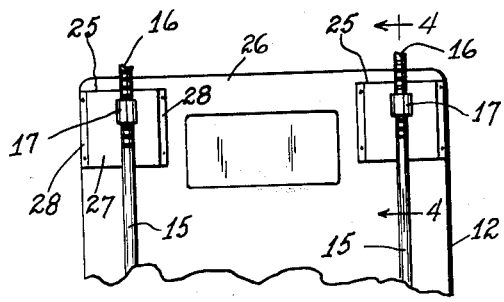
FIGURE 2 is a fragmentary transverse vertical cross-sectional view taken substantially on the line 2—2 of FIGURE 1.

Referring to the drawings, 11 designates a trailer truck comprising a tractor 12 and a trailer 13, the trailer being pivotally connected to the rear portion of the tractor by a conventional fifth wheel assembly 14. The trailer is provided with air brakes operated from the tractor, the tractor being provided with compressed air supply means and being provided with compressed air supply hoses 15, 15 connected to said supply means through suitable control valves, not shown.

The trailer 13 is provided with the respective air brake hoses 16, 16 which are connected to the trailer brake operating mechanism. The trailer hoses 16 are detachably connected to the air supply hoses by means of respective rigid coupling conduit members 17, 17. Thus, for example, the hoses 15 and 16 may be provided at their ends with suitable rigid conduit fittings 18 and 19 which are detachably secured in the opposite ends of the coupling members 17 by means of suitable locking means, such as by the provision of locking pins 20 on the conduit fittings lockingly engaged in L-shaped locking grooves 21 formed internally in the opposite end portions of the coupling members 17.

Suitable reinforcing springs 22 are provided on the portions of the hoses 15, 16 adjacent their end fittings 18 and 19 to prevent crimping of the hoses at these points. Said springs are snugly fitted on the hoses and are of the order of three or four inches in length.

The coupling members 17 are provided with outwardly projecting slide flanges 23. Connected to the side flanges 23, 23 are respective flexible cables 24, 24 which extend from hose supporting assemblies 25, 25 mounted on the opposite side portions of the rear wall of the cab 26 of the tractor.

Each hose supporting assembly 25 comprises a substantially square main housing 27 provided at its rear wall 37 with side flanges 28, 28 secured to the rear wall of the tractor cab 26. The housing 27 is provided with a front cover plate 29 secured to flanges 30 and 31 on the top and bottom walls 32 and 33 of the housing by bolts 34.

A horizontal shaft 35 is rigidly secured at one end thereof centrally to cover plate 29 and is supportingly received at its other end in an annular collar 36 welded to the rear wall 37. A sleeve member 38 is rotatably mounted on said shaft, a pair of bronze bearing sleeves 39 and 40 being interposed between sleeve member 38 and shaft 35. A first thrust bearing assembly 41 is provided on shaft 35 between cover plate 29 and the forward end of sleeve member 38.

Secured on the forward end portion of sleeve member 38 is a cable reel 42 on which the cable 24 is wound. Said cable extends upwardly and passes between a pair of vertical guide rollers 43, 43 journalled in the top portion of housing 27 adjacent an aperture 44 in cover plate 29 through which the cable passes. Said guide rollers are formed with central peripheral grooves 45 receiving and guiding the cable.

The guide pulleys 43 are mounted on respective shafts 46 whose top ends are rotatably engaged in the top wall 32 and whose bottom ends are rotatably engaged and supported in an angle bracket 47 secured to cover plate 29.

The end of the cable is clamped between the flange 23 of the associated coupling member 17 and a clamping plate 48, the cable being looped around a clamping bolt 49 extending through flange 23 and plate 48, as shown in FIGURE 6.

Designated at 50 is a centrally apertured square plate disposed in housing 27 and receiving the sleeve member 38 through its central aperture. The corner portions of plate 50 engage against respective inwardly projecting lugs 51 rigidly secured in the corner portions of housing 27. Top and bottom horizontal flanges 52 and 53 are welded to plate 50 and extend toward rear wall 37. A centrally apertured square cover plate 54 is secured at its corner portions by screws 55 to inwardly projecting lugs 56 secured to the end portions of the flanges 52 and 53.

Designated at 57 is a spiral spring which is disposed in the vertical enclosure defined between plate 50 and plate 54. The inner end of spring 57 is fastened at 58 to an annular spring arbor 59 rigidly secured on the rear end portion of sleeve member 38. The outer end of spring 57 is secured by a bolt 60 to the top flange 52.

A second thrust bearing assembly 61 is provided on sleeve member 38 between cable reel 42 and plate 50.

Figure 3:
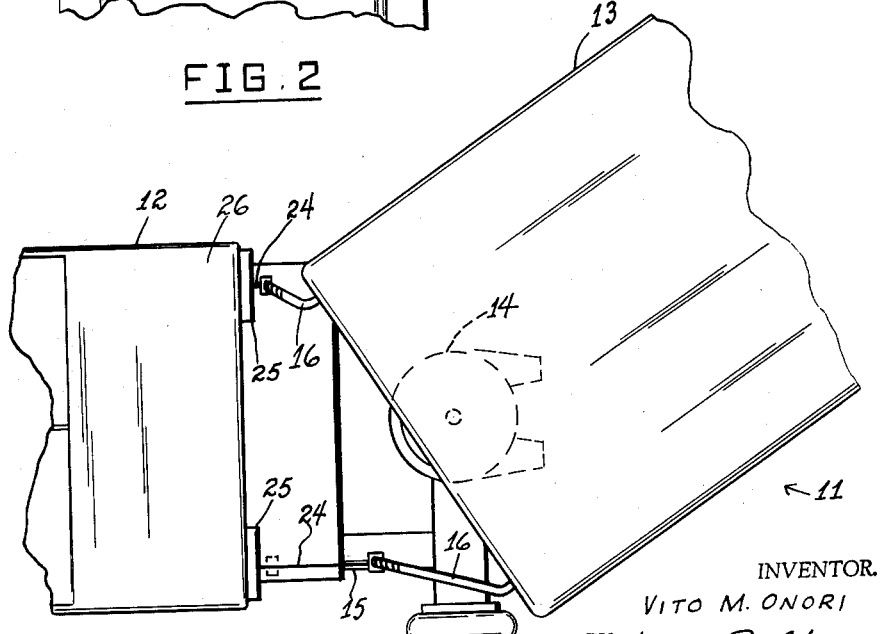
FIGURE 3 is a fragmentary top plan view of the trailer truck of FIGURE 1 with the trailer angled sharply relative to the tractor and illustrating the manner in which the supporting means allows a large degree of extention of the brake hose under these conditions.
Figures 7, 8, 9, 10, 11:
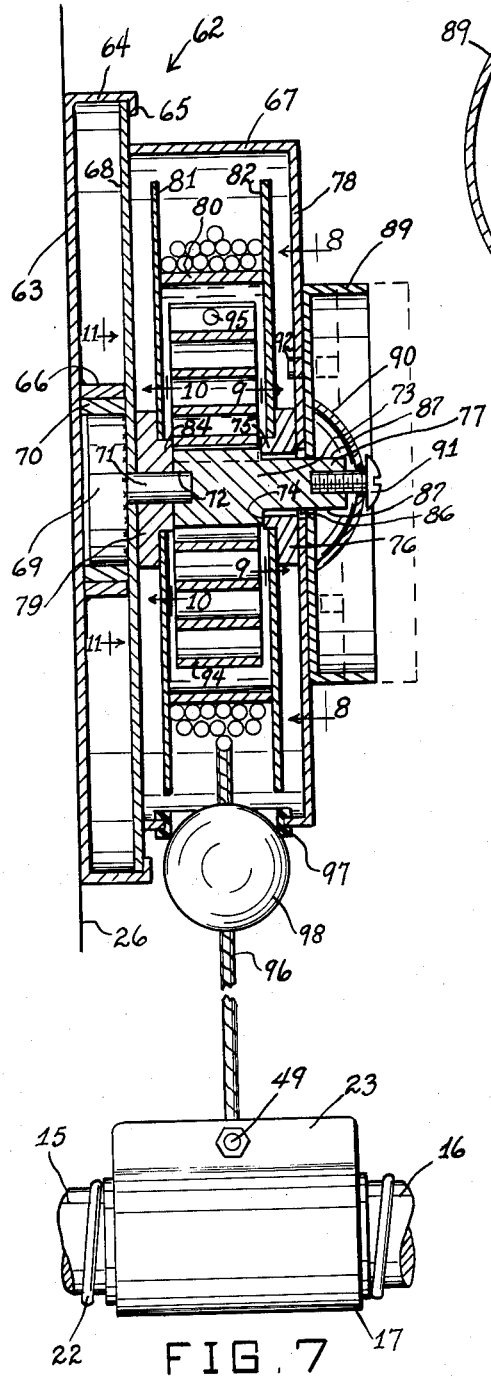
FIGURE 7 is a longitudinal vertical cross-sectional view substantially to the same scale as FIGURE 4, but illustrating a modified form of hose supporting assembly constructed in accordance with the present invention.
FIGURE 8 is a fragmentary transverse vertical cross-sectional view taken susbtantially on the line 8—8 of FIGURE 7.
FIGURE 9 is a fragmentary transverse vertical cross-sectional view taken substantiailly on the line 9—9 of FIGURE 7.
FIGURE 10 is a fragmentary transverse vertical cross-sectional view taken substantially on the line 10—10 of FIGURE 7.
FIGURE 11 is a fragmentary transverse vertical cross-sectional view taken substantially on the line 11—11 of FIGURE 7.

Spring 57 biases its associated coupling member 17 toward a normal position wherein the coupling member is relatively close to the cover plate 29. This supports the brake hose members 15 and 16 in positions elevated well above the tractor bed and away from the fifth wheel assembly 14, as shown in FIGURE 1. When the brake hose members are extended, for example, when the trailer assumes a sharply angled position relative to the tractor, as in FIGURE 3, the associated cable 24 is pulled out of its housing 27, being unwound from its reel 42 against the tension of its associated spiral spring 57. Since the cable 24 is of substantial length, a relatively large amount of extension is permitted, providing a corresponding amount of rewind tension to be developed in spring 57. When the trailer resumes a position of alignment with the tractor, the spring rewinds the cable and returns the coupling member 17 to its normal position adjacent the associated cover plate 29. During the extension and retraction of the hose members 15 and 16 they are always maintained free and clear of the tractor bed and the fifth wheel assembly 14.

Since the cable 24 is connected to the rigid coupling member 17, the force of the cable is never transmitted directly to either flexible hose member 15 or 16, so that no concentrated forces are ever applied to said hose members. Said hose members merely undergo distributed flexure as they move in response to angling of the trailer relative to the tractor. Consequently, the hose members are adequately supported but are never excessively mechanically stressed at any localized area.

Referring now to FIGURES 7 to 11, 62 generally desigates another form of hose supporting assembly according to the present invention which may be employed in place of the hose supporting assemblies 27, 27 previously described. Each assembly 62 comprises a generally circular wall member 63 which may be secured in any suitable manner to the rear wall of the tractor cab 26. Wall member 63 is provided with an annular flange 64 having an inturned retaining lip 65. Centrally secured to wall member 63 is an annular bearing supporting collar 66. Designated at 67 is a generally cylindrical housing having a front cover disc 68 whose peripheral portions are rotably received inside the lip 65 and which is provided with a cylindrical bearing block 69 centrally secured thereto which extends within the supporting collar 66. An annular bronze bearing ring 70 is disposed between block 69 and collar 66, rotatably supporting housing 67 for free swivelling action around the horizontal axis of block 69.

A shaft member 71 is rigidly secured axially to block 69. Shaft member 71 extends supportingly into an axial bore 72 formed in one end of a main reel shaft 73 extending axially through housing 67, the opposite end portion of shaft member 73 being reduced in diameter to define a bearing shoulder 74. Shoulder 74 bears rotatably on a square boss 75 integrally formed on a thrust bearing bushing 76 rotatably receiving the reduced shaft portion, shown at 77, and interposed between said shoulder 74 and the rear end wall 78 of housing 67. A similar thrust bearing bushing 79 rotatably receives the shaft member 71 and is interposed between the forward end of main shaft 73 and the cover disc 68.

Designated at 80 is a cable reel having the circular side flanges 81 and 82. Side flange 81 is formed with a square central aperture 83 which snugly receives a square central boss 84 integrally formed on the front bearing bushing 79. Flange 82 is formed with a square central aperture 85 which snugly receives the square boss 75. Thus, reel 80 is interlocked with bushings 79 and 76, and said reel bushings are rotatable on the shaft members 71 and 73.

The reduced shaft portion 77 extends rotatably through a circular central opening 86 in housing wall 78. Said reduced shaft portion 77 is formed with opposed flats 87, 87 so that it is of non-circular cross-section. Shaft portion 77 extends through a correspondingly shaped non-circular central aperture 88 formed in a flanged disc 89 normally held against wall 78 by a hollow spherical cap washer 90 centrally secured to the end of reduced shaft portion 77 by a removable headed machine screw 91 threaded axially into said shaft portion. Secured to the face of disc member 89 are a pair of diametrically opposed symmetrically spaced anchor pins 92, 92 which are engaged in selected pairs of diametrically opposed locking apertures 93 provided in housing wall 78. Thus, disc member 89 normally locks shaft 73 against rotation with respect to housing 67. By loosening screw 91, said disc member may be moved outwardly from wall 78 sufficiently to disengage pins 92 from one set of locking apertures 93, as shown in dotted view in FIGURE 7, and may be rotated, with the shaft 73, to engage the pins 92, 92 in another set of locking apertures 93, 93, after which the screw 91 may be tightened to cause washer 90 to lock disc 89 against wall 78.

A spiral spring 94 is mounted inside reel 80, the inner end of the spring being anchored to shaft member 73 and the outer end of the spring being anchored at 95 to the cylindrical main wall of the reel. A flexible cable 96 is wound on the reel, the inner end of the cable being secured to the reel and the outer end portion of the cable extending through an opening in the cylindrical wall of housing 67, said opening being provided with an annular rubber grommet 97. The outer end of cable 96 is secured to the connector member 17 in the same manner as described previously with respect to the embodiment of the invention illustrated in FIGURE 4. A rubber cushioning ball 98 is secured on the cable, said ball being substantially larger than the opening of grommet 97, to limit retraction of cable 96 by the action of the biasing spring 94.

Spring 94 biases reel 80 to wind up cable 96 to urge coupling member 17 toward its elevated position, namely, toward a position wherein ball 98 engages grommet 97 and the coupling member 17 is relatively close to the unit 62. When the brake hose members are extended, the cable 96 is unwound against the tension of the spiral spring 94. The amount of biasing tension of said spring may be adjusted by suitably setting the position of shaft 73 by means of flanged disc 89, as above described.

Not only is the cable 96 extensible from the housing 67, but said housing is free to rotate or swivel relative to the support disc 63, since cylindrical bearing block 69 is freely rotatable in collar 66. This allows the cable to swing freely with the connector member 17 and avoids sharp bends in the cable at the grommet 97, thus substantially extending the life of the cable as well as minimizing its required amount of extension and the amount of stress imposed on the spring 94, especially when the trailer assumes a sharply angled position relative to the tractor.

While certain specific embodiments of trailer truck brake hose supporting assemblies have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a trailer truck of the type comprising a tractor vehicle having fluid pressure supply means and a trailer vehicle having a fluid pressure-operated brake mechanism and being detachably connected to the tractor vehicle by means of a fifth wheel assembly, flexible fluid pressure conduit means connecting said tractor vehicle fluid supply means to said trailer vehicle brake mechanism, and means to resiliently support said fluid pressure conduit means, said last-named means comprising a reel housing, means swivelly connecting said reel housing to one of said vehicles, a cable reel rotatably mounted in said housing, a flexible cable wound on said reel and being supportingly connected to said flexible conduit means, and spring means biasing said cable reel in a direction to wind up the cable thereon, whereby to resiliently support said conduit means.

2. In a trailer truck of the type comprising a tractor vehicle having fluid pressure supply means and a trailer vehicle having a fluid pressure-operated brake mechanism and being detachably connected to the tractor vehicle by means of a fifth wheel assembly, flexible fluid pressure conduit means connecting said tractor vehicle fluid supply means to said trailer vehicle brake mechanism, and means to resiliently support said fluid pressure conduit means, said last-named means comprising a reel housing, means on one of said vehicles rotatably supporting said housing so that it can swivel freely around a substantially horizontal axis, a cable reel in said housing and being rotatable around said axis, a flexible cable wound on said reel and being supportingly connected to said flexible conduit means, and spring means biasing said cable reel in a direction to wind up the cable thereon, whereby to resiliently support said conduit means.

3. In a trailer truck of the type comprising a tractor vehicle having fluid pressure supply means and a trailer vehicle having a fluid pressure-operated brake mechanism and being detachably connected to the tractor vehicle by means of a fifth wheel assembly, flexible fluid pressure conduit means connecting said tractor vehicle fluid supply means to said trailer vehicle brake mechanism, and means to resiliently support said fluid pressure conduit means, said last-named means comprising a reel housing, said housing having an outwardly projecting annular flange, a supporting disc secured to one of said vehicles, a bearing collar centrally secured to said disc, means on the housing rotatably received in said collar and rotatably supporting the housing thereon so that it can swivel freely around a substantially horizontal axis, an annular retaining flange on the disc receiving said first-named flange and having an inturned retaining lip engaging said first-named flange and restraining the housing against movement away from the disc, a cable reel rotatably mounted in said housing, a flexible cable wound on said reel and supportingly connected to said flexible conduit means, and spring means biasing said cable reel in a direction to wind up the cable thereon, whereby to resiliently support said conduit means.

4. In a trailer truck of the type comprising a tractor vehicle having fluid pressure supply means and a trailer vehicle having a fluid pressure-operated brake mechanism and being detachably connected to the tractor vehicle by means of a fifth wheel assembly, flexible fluid pressure conduit means connecting said tractor vehicle fluid supply means to said trailer vehicle brake mechanism, and means to resiliently support said fluid pressure conduit means, said last-named means comprising a reel housing, said housing having an outwardly projecting annular flange, a supporting disc secured to one of said vehicles, a bearing collar centrally secured to said disc, means on the housing rotatably received in said collar and rotatably supporting the housing thereon so that it can swivel freely around a substantially horizontal axis, an annular retaining flange on the disc receiving said first-named flange and having an inturned retaining lip engaging said first-named flange and restraining the housing against movement away from the disc, a shaft rotatably mounted in the housing on said axis, spring tension-adjusting means keyed to the shaft and detachably engaged with the housing to hold the shaft against rotation relative to said housing, a cable reel rotatably mounted on said shaft, a flexible cable wound on said reel and being supportingly connected to said flexible conduit means, and a spiral spring in said reel having one end connected to the shaft and its other end connected to the reel and biasing said reel in a direction to wind up the cable thereon, whereby to resiliently support said conduit means.

5. The structure of claim 4, and wherein the housing is formed with apertures circularly spaced around said shaft, and wherein said spring tension-adjusting means comprises a disc member having a projection selectively engageable in said apertures.

References Cited by the Examiner

UNITED STATES PATENTS

| | | | |
|---|---|---|---|
| 1,910,181 | 5/33 | Reid | 188—3 |
| 2,540,203 | 2/51 | Hatcher | 280—421 X |
| 2,564,623 | 8/51 | Harks | 222—74 |
| 2,597,615 | 5/52 | Brown | 242—107 |
| 3,006,047 | 10/61 | Wright et al. | 138—107 X |
| 3,065,925 | 11/62 | Appleton | 242—107.5 |

A. HARRY LEVY, *Primary Examiner.*

LEO FRIAGLIA, *Examiner.*